(No Model.) 2 Sheets—Sheet 1.
J. H. W. ORTMANN.
MACHINE FOR MAKING LOOPS FOR WIRING BOTTLES.
No. 488,612. Patented Dec. 27, 1892.
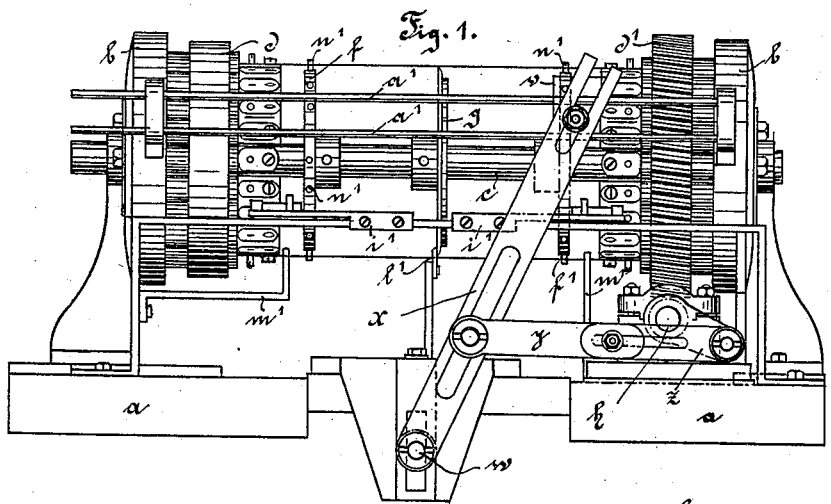
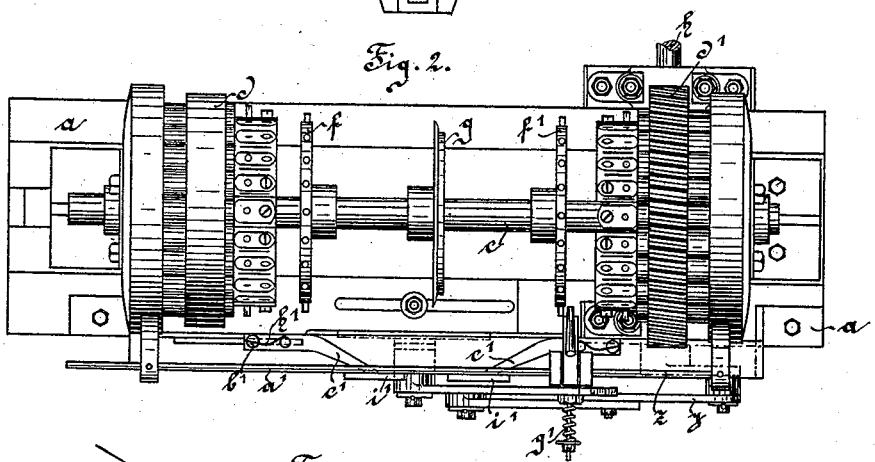
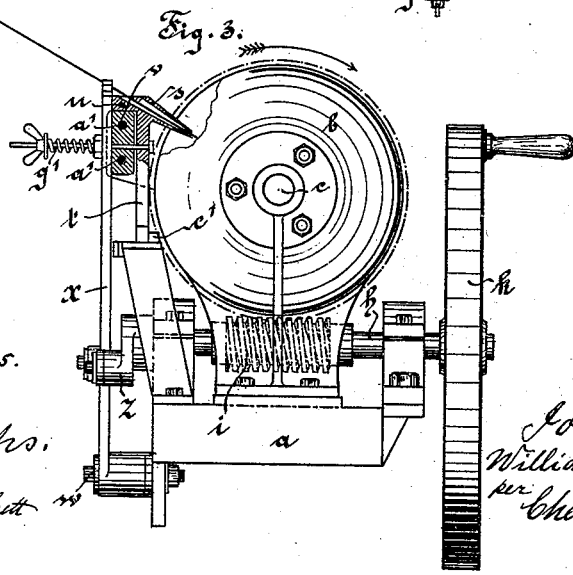
Witnesses.
R. Henderichs.
Jos. T. Winckeleit.
Inventor.
John Henry William Ortmann
per Charles Huelser
Attorney.

(No Model.) 2 Sheets—Sheet 2.
J. H. W. ORTMANN.
MACHINE FOR MAKING LOOPS FOR WIRING BOTTLES.
No. 488,612. Patented Dec. 27, 1892.
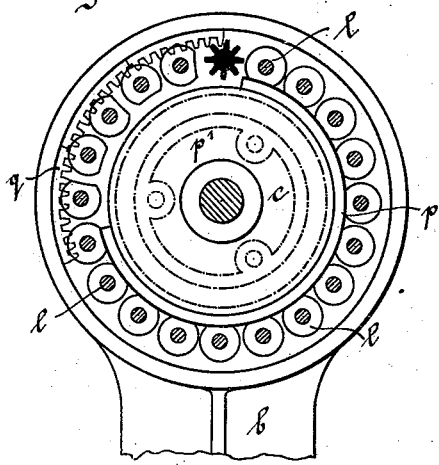
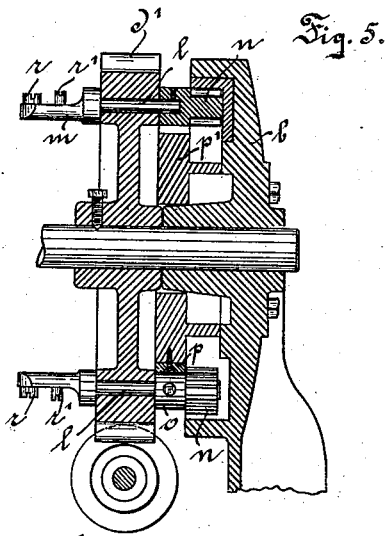
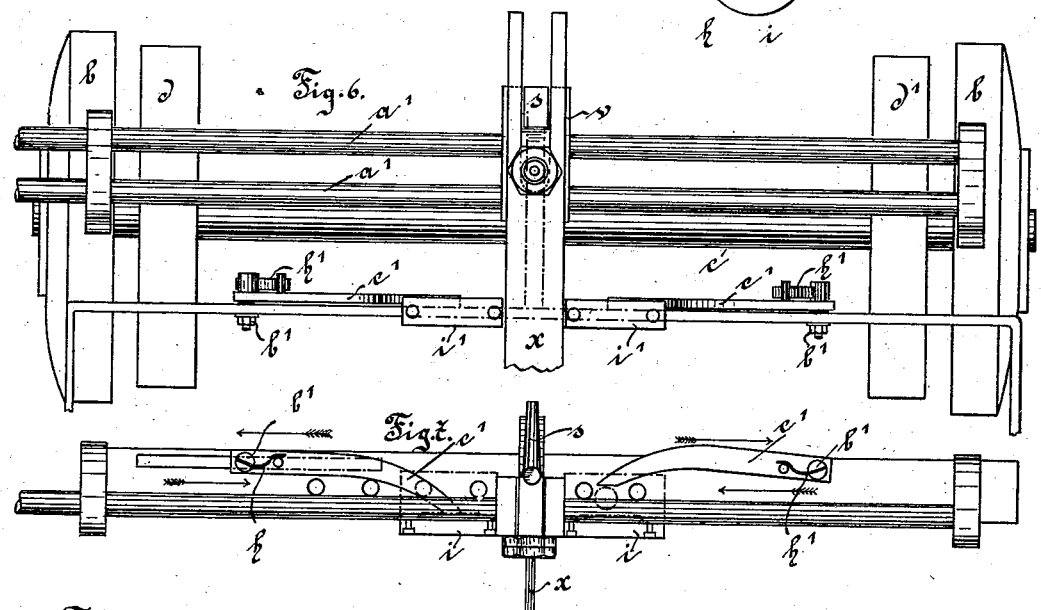
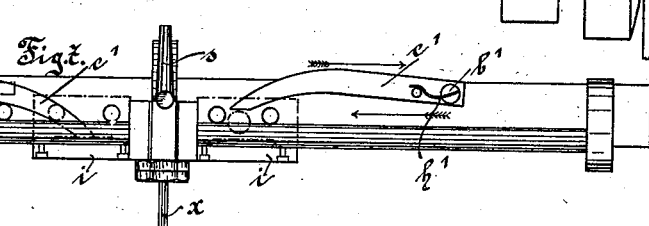
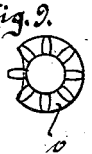
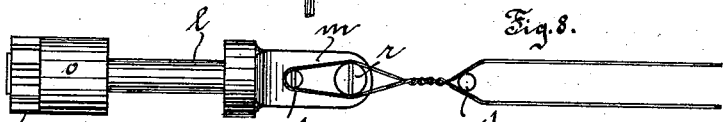
Witnesses.
R. Hendericho.
Jos. T. Winckelsett.
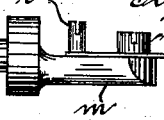
Inventor.
John Henry William Ortmann
per Charles Huelser
Attorney.

UNITED STATES PATENT OFFICE.

JOHN HENRY WILLIAM ORTMANN, OF HAMBURG, GERMANY.

MACHINE FOR MAKING LOOPS FOR WIRING BOTTLES.

SPECIFICATION forming part of Letters Patent No. 488,612, dated December 27, 1892.

Application filed December 2, 1890. Serial No. 373,376. (No model.) Patented in Germany February 3, 1889, No. 52,736.

*To all whom it may concern:*

Be it known that I, JOHN HENRY WILLIAM ORTMANN, a subject of the Emperor of Germany, residing at Hamburg, Germany, have invented a new and useful Improvement in Machines for Producing Wire Loops for Closing Aerated-Water Bottles and the Like, (for which I have obtained a German patent, No. 52,736, dated February 3, 1889,) of which the following is a specification.

The object of this invention is a machine for producing wire loops, such as serve for wiring corked bottles with endless uninterruptedly fed wire.

The improved machine essentially consists of two disks mounted on a rotary shaft with spindles arranged therein over which the endless wire is spun, a device by which the spindles, after the wire is spun up, are set in rotation in order to form the loops, and a cutting apparatus.

Reference being had to the accompanying drawings Sheets I and II, in which like letters refer to like or corresponding parts. Figure 1 is a side elevation Fig. 2 a plan Fig. 3 a front view and partial section of the improved machine. Figs. 4 and 5 represent in two sections at right angles to each other one of the disks which serve for spinning up the wire. Figs. 6 and 7 illustrate in side view and plan respectively the mechanism for regulating the spinning up. Figs. 8 to 11 are different views of the device for specially forming the loop.

On the bed $a$ of the machine are screwed by means of feet cast thereon the two capsules or casings $b$ $b$ which serve as bearings for the machine shaft $c$. One of the casings—in the present case that on the left—is adjustable in a slot of the bed in order to allow the distance of the casings—and thereby the length of the loops to be produced—to be changed. On the shaft $c$ are fixed the disks $d$ $d'$ $f$ and $f'$ and cutter disk $g$, the disk $d'$ being provided at its circumference with teeth, into which gears the worm $i$ mounted on the shaft $h$. On the latter is secured a fly wheel $k$ with hand crank or any other suitable driving device. In the disks $d$ $d'$ the spindles $l$ are secured concentrically to the shaft $c$. (In the drawings twenty in each.) Said spindles consist of the cylindrical part lodged in the disk and provided at one end with a head $m$ and at the other with a gearing $n$. Between the latter and the cylindrical part a collar $o$ is provided which has a cut or cavity, by means of which the spindles slide during part of the revolution of the disks $d$ or $d'$ on a ring $p$ and are maintained in a determined position. The ring $p$ is fitted on a disk $p'$ mounted on the shaft $c$ but does not form a closed circle, in order to allow the spindles to be freed during a portion of the revolution. During this part of the revolution the gearings $n$ of the spindles engage with a toothed sector $q$ provided at the inner circumference of the casings $b$, which sector sets the spindles in rotation. On the spindle heads, projections $r$ and $r'$ are formed, around which is slung the wire coming from a drum. This purpose is accomplished by a device which consists of a feed funnel $s$ secured to an angle lever $t$. The latter on its own part is revolubly secured by a pin $u$ at a slide piece $v$. The latter is connected to the driving shaft $h$ by means of a lever $x$ oscillating about a pivot $w$ and engaging with the crank $z$. By this disposition the slide piece $v$ is once moved to and fro with its feed funnel on the slide rods $a'$ with each revolution of the shaft $h$. In addition to this rectilinear movement with the slide piece however the feed funnel must make a movement at right angles to the said movement in order to lay the wire to be spun up in the proper manner about the projections of the spindle heads. To accomplish this purpose, two curved sliding planes $c'$ revoluble about the pivot $b'$ are provided on the frame of the machine, which planes the lever $t$, carrying the feed funnel, must pass in its movement and through which said lever is given another movement perpendicular to the rectilinear movement. The lever $t$ is moved back into its original position by a spring $g'$ after having passed the sliding plane. To allow of the return of the lever $t$, the sliding surfaces, as mentioned above are arranged so as to be revoluble and are pressed by springs $h'$ against abutments $i'$ lined with leather or other elastic material. In the middle between the two disks $d$ $d'$ a circular knife or cutter $g$ is mounted on the shaft $c$, and correspondingly a counter blade $e'$ is mounted on the frame, by which blade the spun up loops are cut through after having been finished. Subsequently the loops are released from the projections of the spindle heads by a taker-off $m'$. On both sides of this cutter, the disks $f$ and $f'$ referred to above are secured on the shaft, which disks have on their circumference as many pins $n'$ as there are spindles arranged in the disks $d\ d'$.

The improved machine works as follows: The wire wound upon a hasp or drum, when the machine is started, is drawn through the apeature of the feed funnel $s$ and slung around the projections $x$ or $v'$ of the spindle head, which lies in the same horizontal plane with the funnel opening. Subsequently the machine is put in motion, the disks $d\ d'$ moving in the direction indicated by an arrow in Figs. 3 and 4. At the same time the slide piece $v$ is moved to the left—provided that the machine occupies the position shown in Figs. 1 and 2—the angle lever $t$ is meanwhile pressed by the spring $g'$ onto the slide piece until it strikes against the slide surface $c'$ and then slides along the curve. Consequently the feed funnel is turned about its pivot and the wire led on the left around the projections of the spindle, which is opposite to the funnel, owing to the rotation of the shaft $c$. As soon as the angle lever has passed the sliding surfaces,—which is the case when the funnel has passed the rear projection $r'$—the spring $g'$ withdraws the angle lever; simultaneously the reversing takes place; and the funnel now moves to the right at the side opposite to the projections. With this movement the left-side sliding surface, owing to its being revoluble about the pivot $b'$, allows of the passage of the lever $t$, whereas the right-side surface deflects the same again and subsequently the feed funnel lays the wire precisely in the manner above described around the meanwhile advanced contiguous spindle head. In this manner the wire coming from the drum is spun serpentine-fashion upon the disks $d\ d'$. During the winding up, the spindles do not rotate; as soon, however, as they arrive at the place where the ring $p$ ceases and the teeth $q$ commence, the spindles begin to rotate, whereby that part of the two hitherto parallel wires, which is contained between the projections $r\ r'$ of the spindle and the pin $n'$ of the disk $d$ or $d'$ respectively, is twisted together, as may be seen from Fig. 8. When the spindles are out of reach of the teeth, the middle of the wires passes the circular cutter $g$ which presses the wires onto the counter blade situated thereunder and cuts the same off and the takers-off $m'$ press off the finished loops from the spindle heads.

In order to allow a variability of the loops with regard to the entire length, the length of the twisted portion, the shapes of the loops &c. to be attained, the disks $d\ d'$, $f$ and $f'$ are adjustable on the shaft $c$. Also the fulcra of the lever mechanism which determines the hub may be changed. Furthermore the projections of the spindle heads may be replaced by those of other shape and toothed sectors and slide rings of more or less length may be put in.

What I claim is:

1. The combination of a rotating shaft with a pair of disks mounted thereon, intermittently revolved spindles carried by the disks and a reciprocating wire feed between the disks substantially as specified.

2. The combination of a rotating shaft with a pair of disks mounted thereon, spindles carried by the disks, and provided with pinions, a rack intermittently engaging the pinions and with a reciprocating wire feed between the disks, substantially as specified.

3. The combination of a rotating shaft with a pair of disks mounted thereon, spindles carried by the disks and provided with pinions and collars, a rack engaging the pinions, an open ring engaging the collars and with a reciprocating wire feed between the disks, substantially as specified.

4. The combination of a rotating shaft with a pair of disks mounted thereon, intermittently revolved spindles carried by the disks a cutter and curved sliding guides $c'$, between the disks, a reciprocating lever engaged by the guides and a feed funnel secured to the lever, substantially as specified.

In testimony whereof I have signed this specification in the presence of two subscribing witnesses.

JOHN HENRY WILLIAM ORTMANN.

Witnesses:
MAX FOUQUET,
NICOLAS FABRY.